United States Patent
Matsen et al.

(10) Patent No.: US 6,180,932 B1
(45) Date of Patent: Jan. 30, 2001

(54) BRAZING HONEYCOMB PANELS WITH CONTROLLED NET TOOLING PRESSURE

(75) Inventors: Marc R. Matsen; Ronald W. Brown, both of Seattle, WA (US)

(73) Assignee: The Boeing Company, Seattle, WA (US)

( * ) Notice: Under 35 U.S.C. 154(b), the term of this patent shall be extended for 0 days.

(21) Appl. No.: 09/469,647

(22) Filed: Dec. 22, 1999

Related U.S. Application Data (60) Provisional application No. 60/114,267, filed on Dec. 30, 1998.

(51) Int. Cl.[7] .................................................. B23K 13/01
(52) U.S. Cl. .......................... 219/615; 219/633; 219/634
(58) Field of Search .................................. 219/602, 603, 219/615, 616, 617, 632, 634, 635, 659

(56) References Cited

U.S. PATENT DOCUMENTS

| 3,528,867 | 9/1970 | Leatherman et al. . |
|---|---|---|
| 3,574,031 | 4/1971 | Heller, Jr. et al. . |
| 4,035,547 | 7/1977 | Heller, Jr. et al. . |
| 4,433,227 | 2/1984 | Brittin . |
| 4,443,678 | 4/1984 | Jacovides et al. . |
| 4,539,456 | 9/1985 | Mohr . |
| 4,541,891 | 9/1985 | Leatherman . |
| 4,602,139 | 7/1986 | Hutton et al. . |
| 4,622,445 | 11/1986 | Matsen . |
| 4,969,968 | 11/1990 | Leatherman . |
| 4,983,804 | 1/1991 | Chan et al. . |
| 5,123,989 | 6/1992 | Horiishi et al. . |
| 5,128,504 | 7/1992 | McGaffigan et al. . |
| 5,208,443 | 5/1993 | McGaffigan . |
| 5,378,879 | 1/1995 | Monovoukas . |
| 5,391,595 | 2/1995 | Clark, Jr. et al. . |
| 5,510,600 | 4/1996 | Jackson . |

*Primary Examiner*—Tu Ba Hoang
(74) *Attorney, Agent, or Firm*—John C. Hammar (57) ABSTRACT

An induction brazing uses a multisheet, diaphagm retort having isolated pressure zones to control the net tooling pressure at a level that avoids core crush. The isolated chambers in the multisheet diaphragm allow us to apply controlled pressure to the braze joint, especially at the elevated brazing temperature where the honeycomb core is soft and malleable.

15 Claims, 7 Drawing Sheets

METAL SEALING RING

BRAZING HONEYCOMB PANELS WITH CONTROLLED NET TOOLING PRESSURE

REFERENCE TO RELATED APPLICATION

The present application claims the benefit of U.S. Provisional Patent Application 60/114,267, filed Dec. 30, 1998.

TECHNICAL FIELD

The present invention relates to induction brazing, and particularly, to a method to control net tooling pressure in such operations.

BACKGROUND OF THE INVENTION

The tools or dies for forming, brazing, and the like typically are massive, must be heated along with the workpiece, and must be cooled prior to removing the completed part. The delay caused to heat and to cool the mass of the tools adds substantially to the overall time necessary to fabricate each part. Delays are especially significant when the manufacturing run is low rate where the dies need to be changed after producing only a few parts of each kind.

Attempts have been made to reduce fabrication times by actively cooling the tools after forming the composite part. These attempts have shortened the time necessary to produce a part, but the time for and cost of heating and cooling remain significant contributors to overall fabrication costs. Designing and making tools with active cooling increases their cost.

Boeing described a process for organic matrix forming and consolidation using induction heating in U.S. Pat. No. 5,530,227. There, prepregs were laid up in a flat sheet and were sandwiched between aluminum susceptor facesheets. To ensure an inert atmosphere around the composite during curing and to permit withdrawing volatiles and outgassing from around the composite during the consolidation, we welded the facesheets around their periphery. Such welding unduly impacts the preparation time and the cost for part fabrication. It also ruined the facesheets (i.e., prohibited their reuse). U.S. Pat. No. 5,599,472 described another Boeing technique that readily and reliably sealed the facesheets without the need for welding and permitted reuse of the facesheets in certain circumstances.

An example of a metal forming process using the Boeing induction heating workcell is described in U.S. Pat. No. 5,420,400. The process combines brazing and superplastic forming of metal with a single induction heating cycle. In such a process, Boeing uses a metal pack or retort to contain the multiple sheets in the workpiece in a pressure zone filled with an inert atmosphere. The sheets are welded along their periphery of the retort. The welds are costly to prepare, introduce trimming as a necessary step to recover the completed part, and limit the reuse of the retort sheets since they must be shaved smaller when trimming away the weld to recover the completed part.

In preparing the retort, we often use temporary seals to hold the sheets until the sheets are clamped into the press. We prefer a "C" spring clamp, as described in U.S. Pat. No. 5,599,472. The clamp sandwiches the outer susceptor sheets of the retort and provides a compressive force to hold the retort together temporarily, pressing the sheets against an "O" ring gasket. Such a gasket seats between susceptor sheets in a machined groove or crimp around the periphery of adjacent susceptors. For processing below about 600° F., the gasket is generally silicone rubber. Between about 600° F. and 1300° F., the gasket is copper; above 1300° F., the gasket is stainless steel. The gasket and susceptor sheets abut and form a gas seal via the compressive force of the die set. The "C" clamp permits handling of the retort in and out of the die set. The "C" clamp also provides a current path from the top sheet to the bottom sheet (when the gasket is rubber or stainless steel). The "C" clamp can be omitted when we use a copper gasket, but handling the susceptor sheets is more difficult. The "C" clamp jumper is only required for electrical continuity when the gasket is not an electrical conductor and, then, only on the edges of the retort transverse to the induction coils since the coils induce eddy currents in the susceptor that flow parallel to the coils.

By "forming," we mean shaping the composite or metal and retort in its plastic state. "Forming" may entail superplastic forming, drawing, hot pressing, or some other shaping operation.

The dies or tooling for induction processing are ceramic because a ceramic is not susceptible to induction heating and, preferably, is a thermal insulator. Ceramic tooling is strengthened and reinforced with fiberglass rods or other appropriate reinforcements to permit it to withstand the temperatures and pressures necessary to form, to consolidate, or otherwise to process the composite materials or metals. Ceramic tools cost less to fabricate than metal tools and also generally have less thermal mass than metal tooling. Because the ceramic tooling is not susceptible to induction heating, it is possible to use the ceramic tooling in combination with induction heating elements to heat the retort without significantly heating the tools. The method reduces the time required and energy consumed to fabricate a part.

Most operations require a susceptor in or adjacent to the workpiece to achieve the necessary heating. The susceptor is heated inductively and transfers its heat principally through conduction to the workpiece that is sealed within the susceptor envelope or retort. Metals in the workpiece may themselves be susceptible to induction heating, but the metal workpiece usually needs to be shielded in an inert atmosphere during the high temperature processing to avoid oxidation of the metal. We enclose the workpiece (one or more metal sheets) in a metal retort when using our ceramic tooling induction heating press. Enclosed in the metal retort, the workpiece does not experience the oscillating magnetic field which instead is stopped in the retort sheets, so heating occurs by conduction from the retort to the workpiece.

Induction focuses heating on the retort and workpiece rather than on the entire tool and eliminates wasteful, inefficient heat sinks. Because the ceramic tools in our induction heating workcell do not heat to as high a temperature as the metal tooling of conventional, prior art presses, problems caused by different coefficients of thermal expansion between the tools and the workpiece are reduced.

To consolidate or to form organic matrix composite materials, an organic matrix composite preform is placed adjacent a metal susceptor. The susceptor heats inductively, and in turn, heats the preform. A consolidation and forming pressure is applied to consolidate and, if applicable, to form the preform at its curing temperature.

The retort often includes three susceptor sheets, typically aluminum, an aluminum SPF alloy, or a 'smart' alloy, sealed around their periphery to define two pressure zones. The first pressure zone surrounds the workpiece and is evacuated and maintained under vacuum. The second pressure zone is pressurized (i.e., flooded with gas) to help form the composite panel or workpiece. The shared wall of the three layer sandwich acts as a diaphragm in this situation. In the present invention, we use such a retort and control the tooling pressure across the diaphragm to make delicate, brazed parts. The retort is placed in an induction heating press on the forming surfaces of dies having the desired shape of the molded composite part. After the retort and preform are inductively heated to the desired elevated temperature, pressure is applied (while maintaining the vacuum in the pressure zone around the preform) to consolidate the preform against the die into the desired shape of the completed part.

The susceptor sheets, at least on the outside of the retort, might be a 'smart' material that has a Curie point at a desired temperature. For example, for consolidating BMI, we might use INVAR36 and for consolidating thermoplastic polyimides, PERMALLOY and KOVAL. The inner diaphragm sheet typically will be aluminum because it does not intereact with the magnetic field and aluminum generally is less expensive and more readily available than the 'smart' materials.

Brazing usually is done in a vacuum furnace. This process involves large facilities costs (it requires significant space in a specialized building), high tooling costs, and long cycle times. The use of induction heating reduces facility cost due to reduced cycle time. Many more panels can be brazed in the same amount of time using induction brazing over the standard vacuum furnace. Also, the same tools used for induction brazing can be used to hot form the facesheets. This eliminates the requirement for a separate high cost tool. Finally, better control of the thermal cycle using induction brazing affords better braze quality. Vacuum furnaces with the characteristic long thermal cycles cannot tailor the thermal cycles to avoid detrimental reactions between the brazing alloys and the base materials. The induction heating process with its rapid heat-up and cool down rates and good thermal control at the critical processing temperatures can tailor the thermal cycle to avoid these detrimental reactions.

When induction brazing honeycomb panels, waviness of the panels can occur if the tooling pressure is insufficient to hold the panel in intimate contact with the die. Usually, 15 to 20 psi is sufficient to keep the susceptor and panel on the die surface. If the core is thin or when brazing occurs at high temperatures (1500–1800° F.), 15–20 psi tooling pressure can cause core crush. The present invention controls the pressure using several, adjustable pressure zones in the retort design to hold the retort (i.e., the part and the susceptor) against the die without crushing the core.

Efforts to reduce tooling mass and to speed cooling apply forced gas to the vacuum furnace technology. Forced cooling gas only slightly improves the cycle time, but, unfortunately, raises the cost of an already expensive operation. Active or forced cooling often produces undesirable temperature gradients across the retort because the cooling occurs unevenly.

Our induction heater uses induction heating and reinforced cast ceramic tools with good durability and affordability. Ceramic dies provide precise control of the geometry of the component while eliminating the requirement to heat the entire tool. These characteristics allow for rapid, controlled heating and cooling down rates which lead to a more efficient, affordable, flexible method of forming and brazing of honeycomb panels. The basic tool design consists of an outer box usually constructed of phenolic materials. Copper tubing to form the induction coils and fiberglass reinforcement rods are held in place with this phenolic box before the ceramic is cast. After the ceramic is cast, the phenolic boards compress the dies when nuts on the end of the reinforcement rods are tightened. Compression of the die increases its durability.

The tool may include a metallic susceptor liner that acts as an antenna for the magnetic flux produced by the coil. The susceptor is typically a 0.045 inch thick layer of magnetic alloy which has a Curie point (temperature at which the alloy becomes nonmagnetic) that matches or closely approximates the desired processing temperature.

An oscillating electrical current (typically, 3 kHz) is passed through the coil, and creates an oscillating magnetic field which emanates from the coil through the ceramic. The magnetic field interacts with the susceptor, which is an alloy having high magnetic permeability. Magnetic flux experiences lower resistance inside such materials. The 'smart' susceptors when utilized below the Curie temperature tightly house the flux lines generated by the coil. The high density of time varying magnetic flux in the susceptor creates internal voltages which "induce" eddy currents that are constricted to a thin layer because of the influence of the magnetic permeability of the susceptor as shown by:

CURRENT DEPTH is proportional to $$\sqrt{\frac{\rho}{\mu f}}$$

wherein $\mu$ is permeability, $\rho$ is resistivity, and f is frequency.

The current heats the susceptor. The heat is trapped inside the ceramic tool because the ceramic is highly insulative. Cooling of the induction coil tubes by coolant flowing within them also limits how much of the die that is heated. Heating is focused on the part, and the mass being heated is far smaller than the traditional approach. A high degree of the magnetic field coupling (efficient/direct energy transfer) occurs between the magnetic field and the susceptor. All these factors contribute to rapidly heat the workpiece, primarily by conduction from the susceptor to the enclosed part.

As the susceptor heats, any location on the susceptor that reaches the Curie point has its permeability decline significantly and effectively becomes nonmagnetic. That location expels magnetic flux. The flux and current will bend through the remaining high permeability magnetic material surrounding the hot spot. The rate of heating in the nonmagnetic 'hot spot' will fall because no current flows there and will increase in the remaining areas until all of the susceptor reaches the Curie point. The induction efficiency when all the material is nonmagnetic is much less. The temperature will hover around the Curie point, because, as cooling occurs anywhere in the susceptor, currents are created in the then magnetic areas. The currents reheat the susceptor to the Curie point. Therefore, if the Curie point is matched to the desired processing temperature, a powerful, repeatable, and simple thermal control mechanism is available.

Heat generated by the induced current in the susceptor is held inside the die cavity because the ceramic material is an insulator. A steep thermal gradient develops through the thickness of the die. The coefficient of thermal expansion for our castable ceramic material is low. Therefore, this material easily supports the thermal stresses that result from this steep gradient. Also, the reinforced nature of the die allows for it to withstand any tensile forces produced by the internal pressurization required to form the facesheets during brazing. Reinforcement is required because the ceramic material is weak in tension but strong in compression. The approach, just as in reinforced concrete, is to utilize the material in compression where it has good durability characteristics. The fiberglass reinforcement rods have good tensile strength and are a dielectric (not electrically conductive) material that does not heat inductively. During processing, tensile forces are counteracted by the compressive preload applied to the die. The net force on the ceramic never reaches tensile loads of any significance.

SUMMARY OF THE INVENTION

The present invention is an improved method and system for brazing honeycomb panels within a three sheet, diaphragm retort. First, we "hot form" the titanium facesheets for the honeycomb panel. We select a 'smart' susceptor which substantially matches the forming temperature of the facesheets. If the facesheets are Ti 6Al-4V, for example, then the susceptor should have a Curie point of about 1650° F. After the facesheets have been formed, their surfaces are cleaned outside the die with suitable etchants, degreasers, detergents, or their combination. We apply brazing foil to the clean facesheets. The core is sandwiched between the facesheets, and the panel is returned to the die. Two distinct pressure zones divided by a diaphragm are formed by the arrangement of the driver sheets in the retort that we use for brazing. A first zone contains the panel. This zone can either be purged (i.e., evacuated) or pressurized with inert gas. Pressure in this zone forces the facesheet against the core to define the outer mold line (OML) and holds the facesheet in the desired geometry. The inert gas pressure precludes any waviness or wrining of the facesheet and eliminates oxidation that otherwise might occur at the forming temperature.

Inert gas pressure in the second zone presses the diaphragm against the facesheet for the inner mold line (IML) to hold it against the core. This pressure also holds the core against the OML facesheet.

Figure 7:
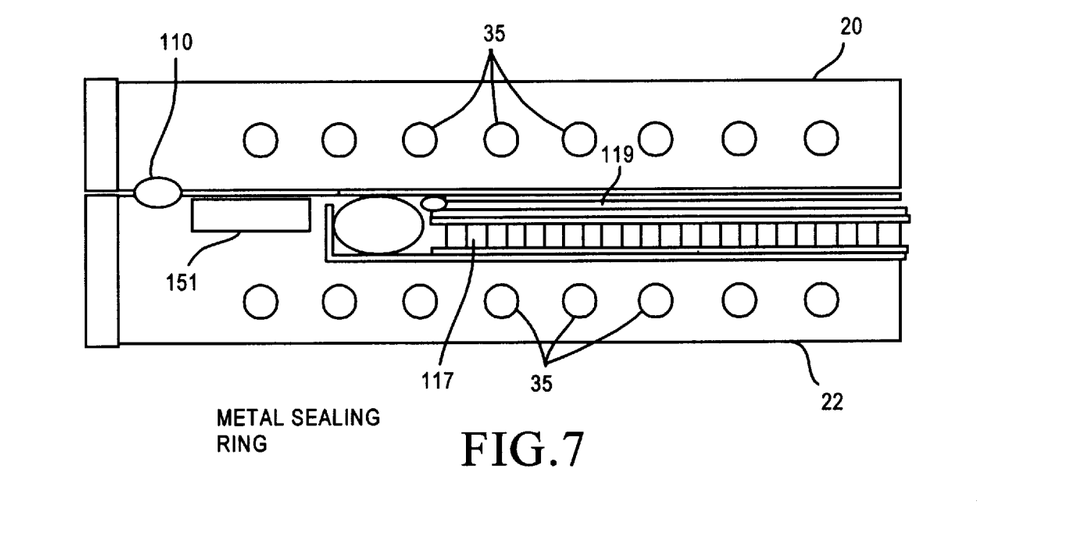
FIG. 7 illustrates the use of ferrite blocks at the ends of the retort and inset into the lower die to shape the magnetic flux and to improve control of the thermal uniformity in the retort.
Figure 8:
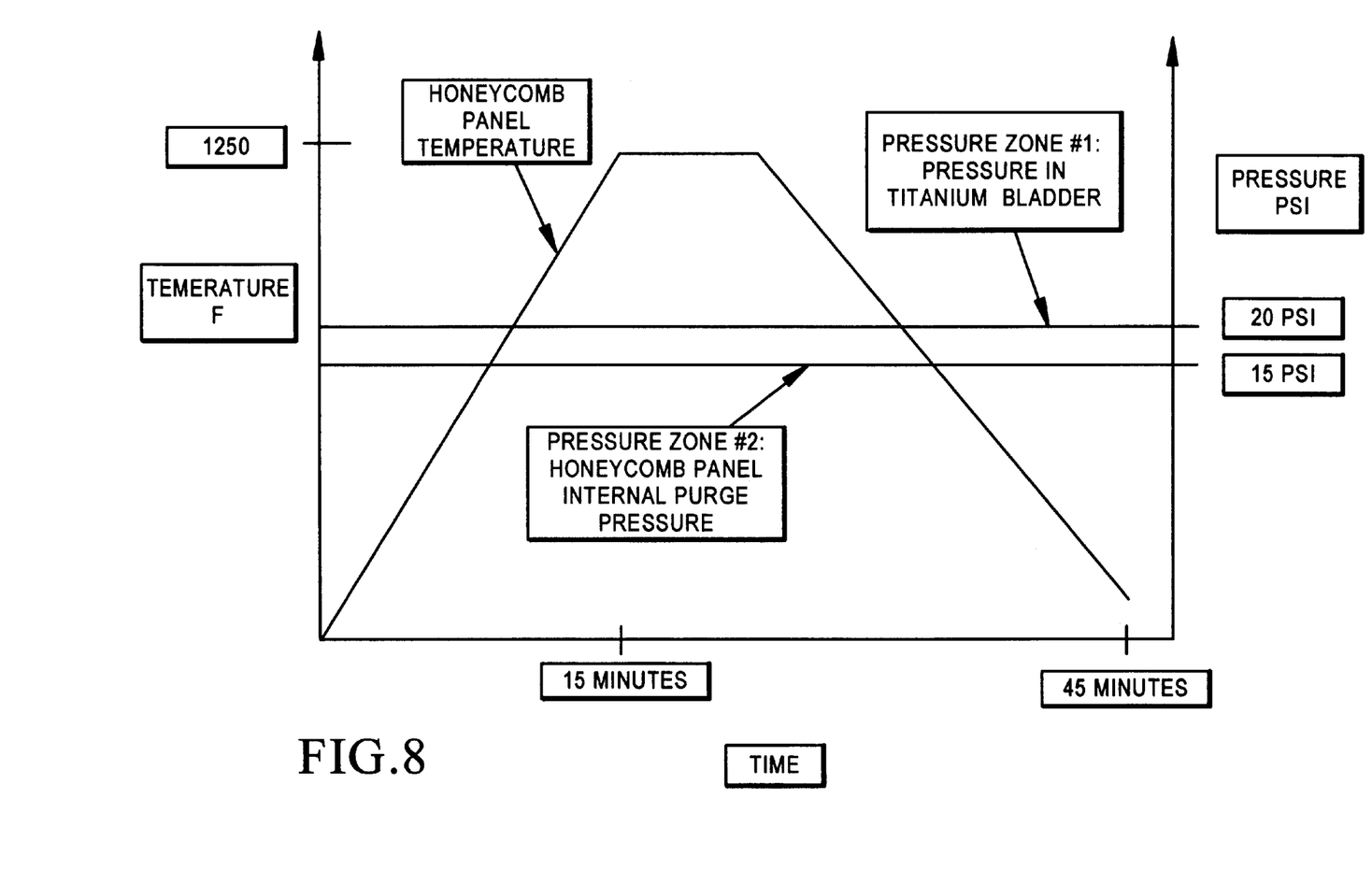
FIG. 8 is a graph showing a typical processing cycle for brazing aluminum panels.
Figure 9:
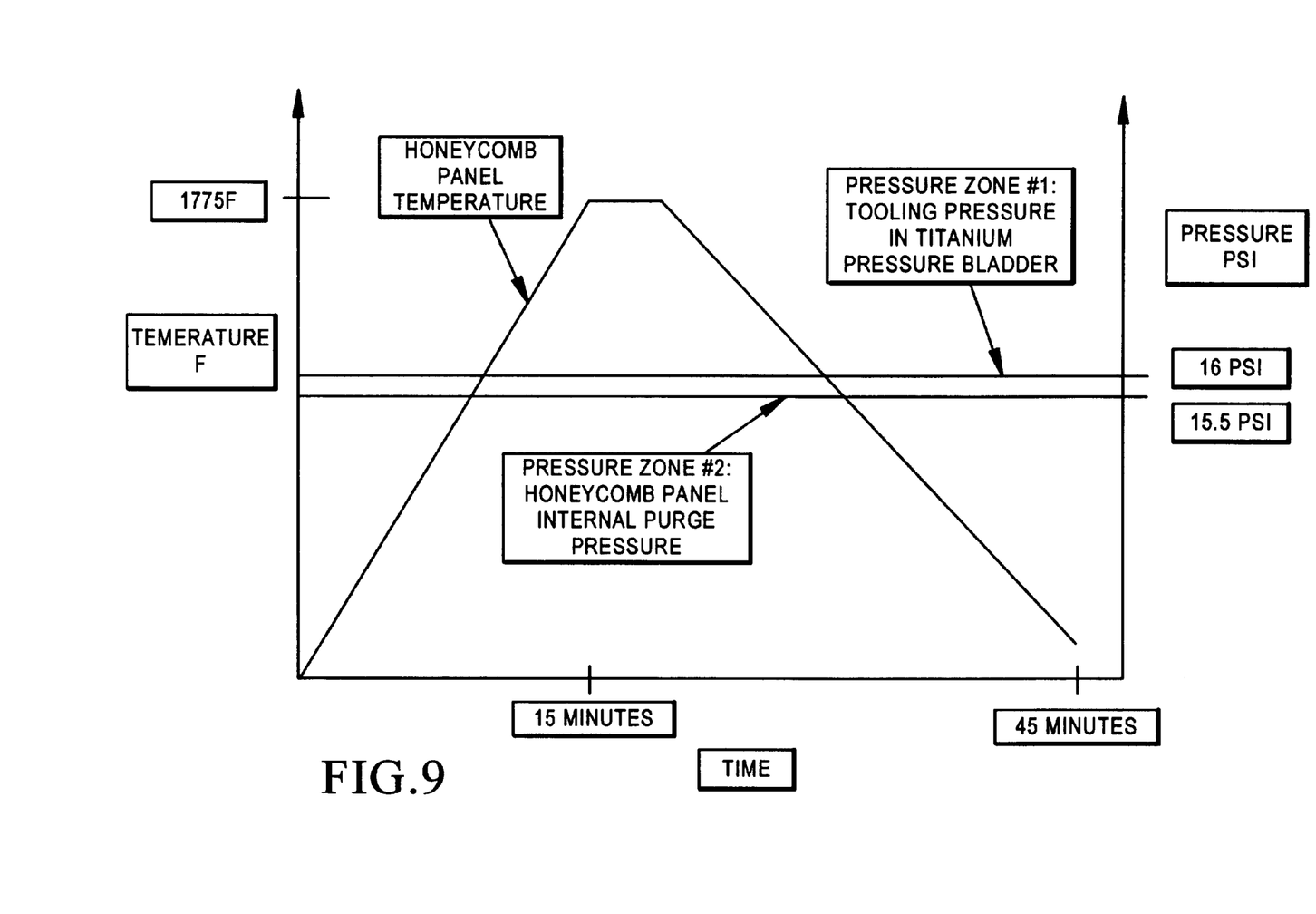
FIG. 9 is another graph showing a typical processing cycle for brazing titanium panels using TiCuNibraze alloy.

As suggested by Edward Woods and described in greater detail in U.S. patent application Ser. No. 09/187,614, ferrite blocks (151, FIG. 7) at the edges of the coil improve the heating rate we can use to reach a substantially uniform temperature at the Curie point of the susceptor. The ferrite blocks focus the magnetic flux generated by the coil at the edge and align the flux for smooth entrance and exit from the susceptor, thereby creating a more uniform flux field in the workpiece. The blocks substantially eliminate the edge effect of the coil. More uniform flux throughout the workpiece decreases the time needed to reach a uniform thermal condition. Faster heating reduces processing time and is especially important both to control the metallurgical reactions present in some braze alloy - base metal combinations and to control core crush.

The susceptor for brazing titanium honeycomb panels depends on the brazing alloy used. Our common brazing alloy for brazing titanium is aluminum 3003. The susceptor in this case is 420 Stainless Steel, which has a Curie point of 1250° F. This Curie point falls in the middle of the allowed brazing temperature range from 1240°F. and 1265° F. Another common brazing alloy is TiCuNi (70%Ti, 15%Cu, 15%Ni). Its susceptor is a Cobalt alloy (78%Co, 11%Ni, 11%Fe) having a Curie point of about 1815° F., which produces a level temperature in operation of about 1780–1790°F. In one embodiment, appropriately shaped susceptors form a liner on the inside of the dies, similar to the concept we described in U.S. Pat. No. 5,587,098. They receive the magnetic energy and convert it into thermal energy through eddy current heating, as we previously explained.

DETAILED DESCRIPTION OF THE PREFERRED EMBODIMENT

Before describing our preferred brazing process, we first will provide a brief description of the induction heating workcell in which we generally perform the process.

Boeing's Induction Heating Workcell

Figure 1:
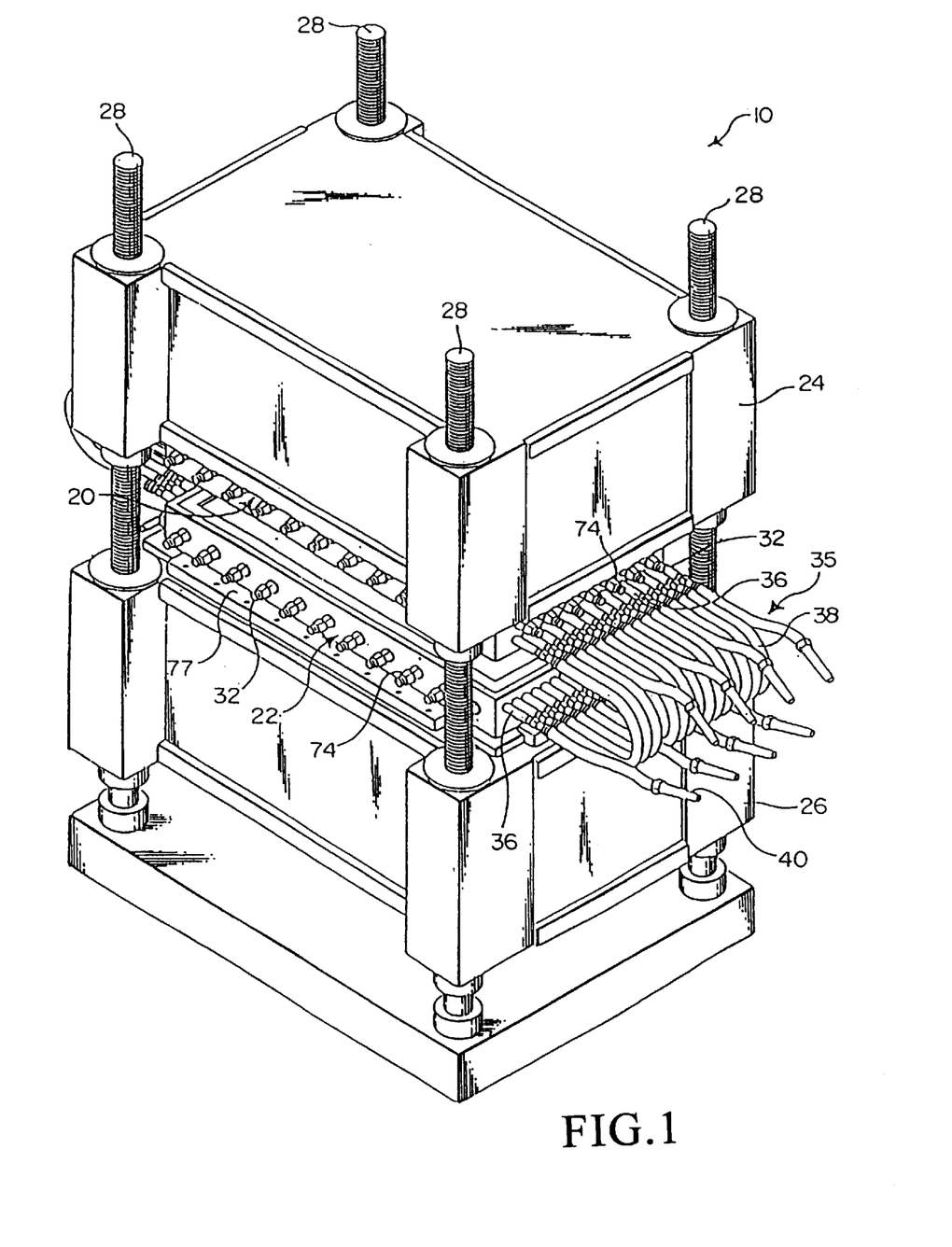
FIG. 1 is a perspective view of our induction heating workcell for induction brazing forming organic matrix composite panels or metal workpieces.

In FIG. 1, an induction heating workcell 10 includes tools or dies 20 and 22 mounted within upper 24 and lower 26 strongbacks. The strongbacks are each threaded onto four threaded column supports or jackscrews 28. We can turn the jackscrews using a bellows or other actuation mechanism to move one strongback up or down relative to the other. The strongbacks 24 and 26 provide a rigid, flat backing surface for the upper and lower dies 20 and 22 to prevent the dies from bending and cracking during repeated consolidation or forming operations. Preferably, the strongbacks should be capable of holding the dies to a surface tolerance of +/−0.003 inches per square foot of the forming surface in the toolbox. Such tolerances are desirable to achieve proper part tolerances. The strongbacks may be steel, aluminum, or any other material capable of handling the loads present during forming, consolidation or brazing, but we prefer materials that are nonmagnetic to avoid any distortion to the magnetic field that our induction coils produce. In some circumstances, the dies may be strong enough themselves that strongbacks are unnecessary. They also may include internal reinforcement such as described in U.S. Provisional Patent Application 60/071,765.

The dies 20 and 22 are usually ceramic that is reinforced with a plurality of fiberglass rods 32. The rods are held with bolts 74 that extend both longitudinally and transversely in a grid through each die. Each die usually is framed with phenolic reinforcement 72 as well. Each die may be attached to its strongback by bolting, clamping, or any suitable fastening technique. In the preferred embodiment, both dies are mounted on support plates 76 which are held in place on the respective strongbacks through the use of clamping bars 77. The clamping bars 77 extend around the periphery of the support plates 76 and are bolted to the respective strongbacks.

The dies should not be susceptible to inductive heating so that heating is localized in the retort rather than distributed throughout the press. We prefer a ceramic that has a low coefficient of thermal expansion, good thermal shock resistance, and relatively high compression strength, such as a castable fused silica ceramic.

A plurality of induction coils sections 35 are embedded in the dies, and are connected to form a solenoid coil. Each induction coil 35 includes a straight tubing section 36 that extends along the length of each die. A flexible coil connector 38 joins the straight tubing sections 36 in the upper die 20 to straight tubing sections in the lower die 22. Connectors 40 located at the ends of the induction coils connect the induction coils 35 to an external power source or coil driver 50 and to a source of coolant (i.e., a water line, accumulator, or reservoir).

Cavities 42 and 44 can be formed in the respective dies to hold tool inserts 46 and 48, although single piece dies generally are simpler to use. The upper tool insert 46 usually will have a contoured forming surface 58 shaped to correspond with the desired shaped of the outer mold line (OML) surface of the completed part. The lower tool insert determines the inner mold line (IML). The tool inserts preferably are formed the same castable ceramic as the dies. We prefer ceramic tooling because it provides the greatest flexibility and versatility for Boeing's induction heating workcell. In the preferred embodiment, the interior 70 of the dies is formed of a castable ceramic and the exterior sides from precast composite phenolic resin blocks 72. Both can be reinforced with chopped fibers or nonwoven or woven reinforcing mats.

To increase the strength of the dies, fiberglass reinforcing rods 32 extend both longitudinally and transversely through the precast exterior side blocks 72 and the interior 70 to maintain a compressive load on the blocks 72, interior 70 and the tool inserts 46 and 48, if they are used. Suitable dies are described in U.S. Pat. No. 5,683,608.

Figure 2:
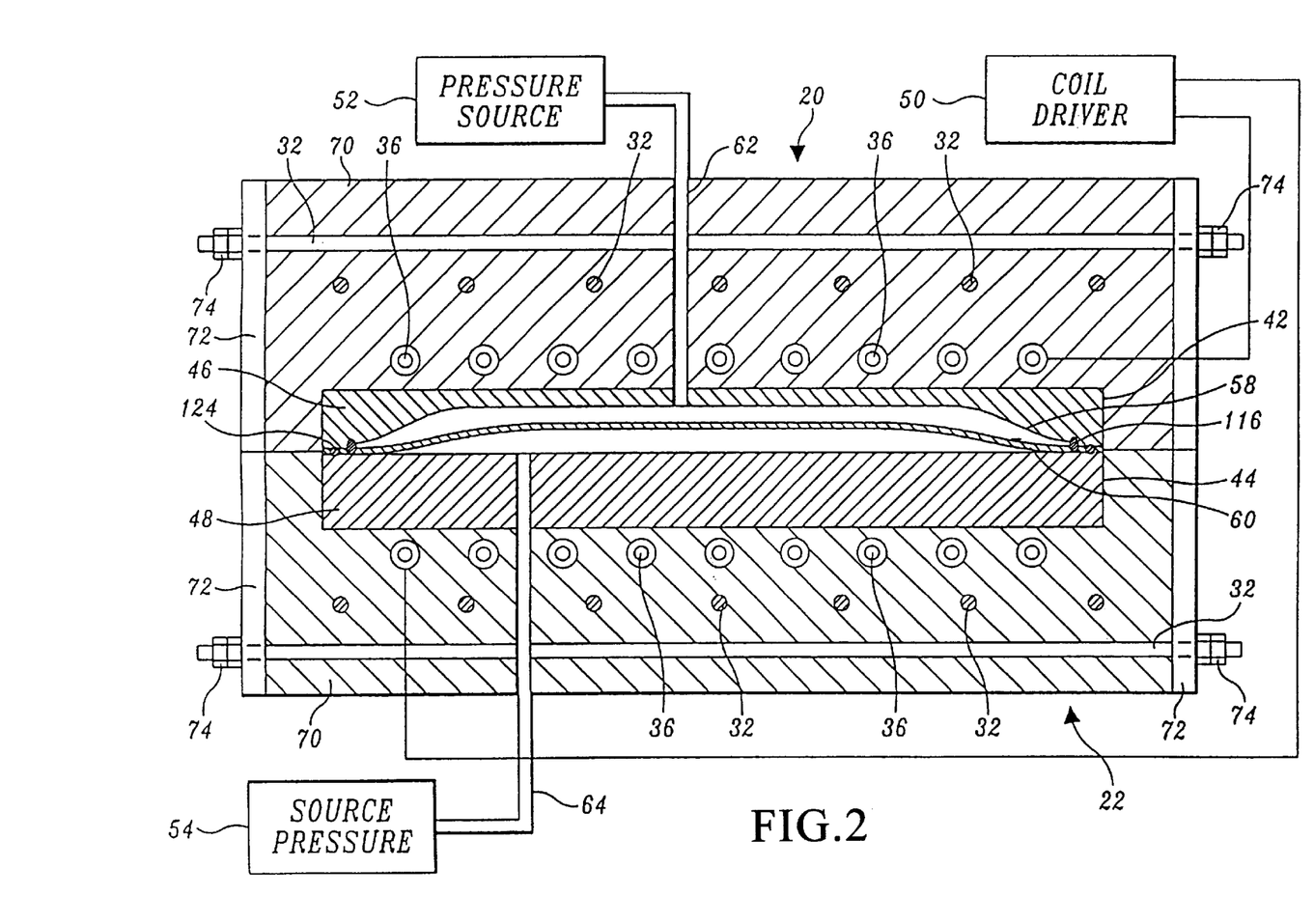
FIG. 2 is a schematic cross-sectional view of the apparatus of FIG. 1.

FIG. 2 shows a retort 60 in the workcell positioned between the tool inserts 46 and 48 along the centerline of the solenoid induction coil. The retort 60 includes a metal workpiece having outer facesheets covering a central honeycomb core and susceptor sheets sandwiching the facesheet—core—facesheet panel. The susceptor sheets of the retort are heated to the brazing temperature by energizing the coils 35. When the sheets reach their Curie point at the desired brazing temperature, pressure source 52 applies pressure to the upper surface of the retort 60 through a conduit 62 that passes through the upper die 20 and upper tool insert 46. In the induction workcell shown in FIG. 2, a pressure source 54 applies pressure to the lower surface of the retort 60 through a conduit 64 that passes through the lower die 22 and lower tool insert 48. The pressure applied to the retort 60 is maintained until the retort has formed to the contour of the forming surface 58. The pressure sources 52 and 54 generally apply a differential pressure to the retort 60. Generally, the workcell does not need to include gas lines if a multizone retort is used to enclose the part.

Pin holes (not shown) in the tool inserts vent gas trapped between the retort 60 and the forming surface 58 as the retort deforms. Such pin holes can be coupled to a flow meter to monitor the progress of the deformation, as suggested in U.S. Pat. Nos. 5,419,170; 5,309,747 and 5,129,248.

When brazing is complete, the induction coil 35 is de-energized, and the pressure relieved. The tool inserts and dies are separated. We remove the formed retort 60 from the press and recover the completed part from between the susceptor sheets.

An alternating electrical current in the induction coils 35 produces an alternating magnetic field that heats the susceptor sheets of the retort via eddy current heating. The frequency at which the coil driver 50 drives the coils 35 depends upon the nature of the retort 60. Current penetration of copper at 3 kHz is approximately 0.06 inches, while penetration at 10 kHz is approximately 0.03 inches (0.75 mm). The shape of the coil also has a significant effect upon the magnetic field uniformity. Field uniformity is important because temperature uniformity in the retort is directly related to the uniformity of the magnetic field. Uniform heating insures that different portions of the retort will reach the desired temperature at approximately the same time. Solenoid type induction coils provide a uniform magnetic field, and are preferred. Greater field uniformity is produced in a retort that is symmetric. Those of ordinary skill can establish series/parallel induction coil combinations, variable turn spacing and distances between the part and the induction coil by standard electrical calculations to achieve the desired heating. Temperature uniformity also is improved by using ferrite blocks at the edges of the coil along its centerline to alter the magnetic flux.

The brazing operation of the present invention is faster than prior art operations because we do not heat the large thermal mass of either the dies or tool inserts prior to the induction heating process. The retort is heated, the tool is not. Thus, the necessary processing temperature is achieved more rapidly. In addition, the highly conductive materials in the retort provide rapid heat transfer and product. When the driver 50 is de-energized, the dies and the retort cool rapidly to a temperature at which we can remove the retort from the workcell, saving time and energy over conventional systems. In addition, the thermal cycle is not as limited by the heating and cooling cycle of the equipment and tools so we can tailor the thermal better.

Figure 3:
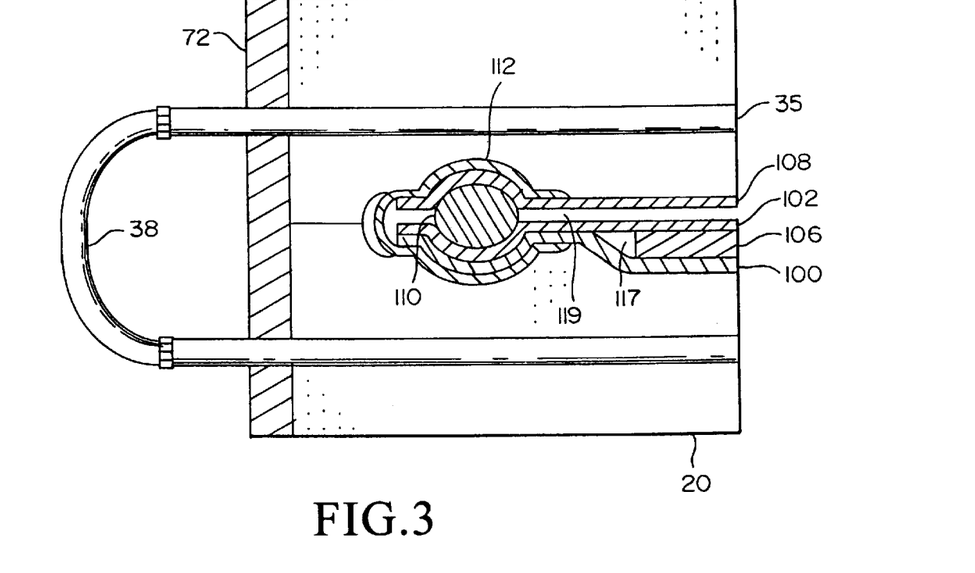
FIG. 3 illustrates an edge seal in the susceptor sheets used in a retort during brazing.

As shown in FIG. 3, susceptor sheets 100 and 102 are sealed around their periphery with a crimp. A first pressure zone 117 between the susceptors 100 and 102 surrounds the workpiece. A third sheet 108 of susceptor is positioned over the second sheet 102 and is edge sealed with high temperature gasket 110. The second and third sheets together define a second pressure zone 119 that can be pressurized with argon or another suitable gas during the brazing operation to provide an overpressure or a net tooling pressure. A contact edge strip 112 acts as a compression edge seal and provides electrical continuity (i.e., acts as an electrical jumper) between the first and the third sheets 100 and 108 as well as pressing the sheets against the gasket 110. Additional compressive force is applied when the retort is clamped in the press. The first and second sheets abut in the vicinity of the gasket 110. Typically the contact edge strip 112 is a copper, elongated "C" because it has good conductivity, ductility, and susceptibility. Other metals could be substituted.

In FIG. 3, the first and third sheets 100 and 108 of susceptors contact the dies and do not leave additional pressure zones between the outer susceptors and the dies, like the pressure zones we described with reference to FIG. 2. A system of conduits fabricated in the dies is described in U.S. Pat. Nos. 4,708,008; 5,129,249; 5,309,747; 5,419,170; 5,689,987; or 5,692,406. When a third sheet 108 of susceptor is used, the retort itself incorporates the necessary pressure zones. The dies can be porous, and are much easier to manufacture. Such dies do not need to carry or contain high pressure gases. They are lighter and are less expensive. Therefore, we prefer a system like that illustrated in FIG. 3. With a multizone retort, pressure can be introduced and controlled inside the sealed retort envelope.

Figure 4:
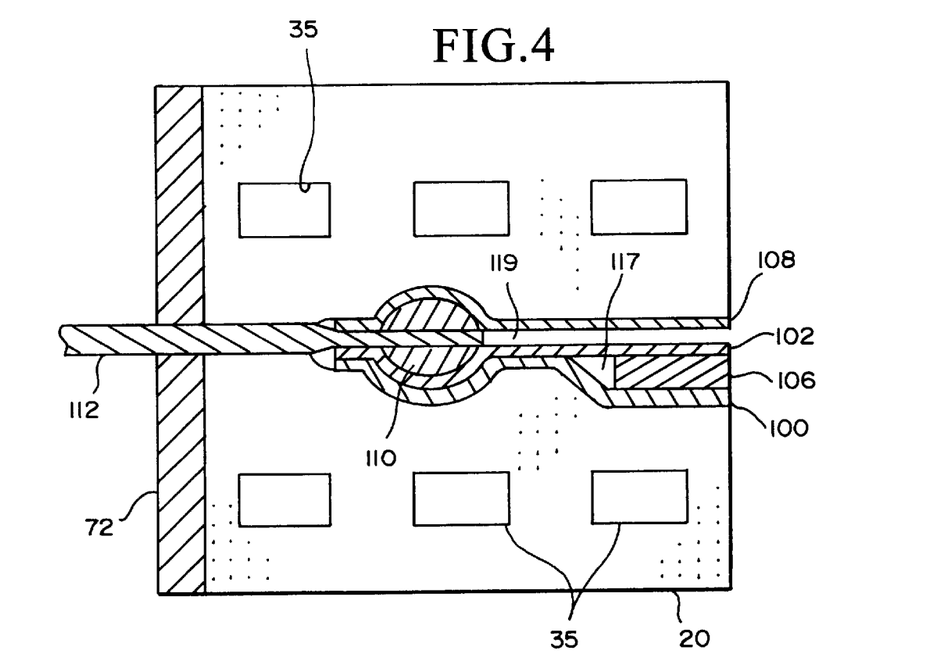
FIG. 4 illustrates pressure lines penetrating the edge strip gasket for a seal like that shown in FIG. 3 to allow pressurized gas into pressure zones in the retort.
Figure 5:
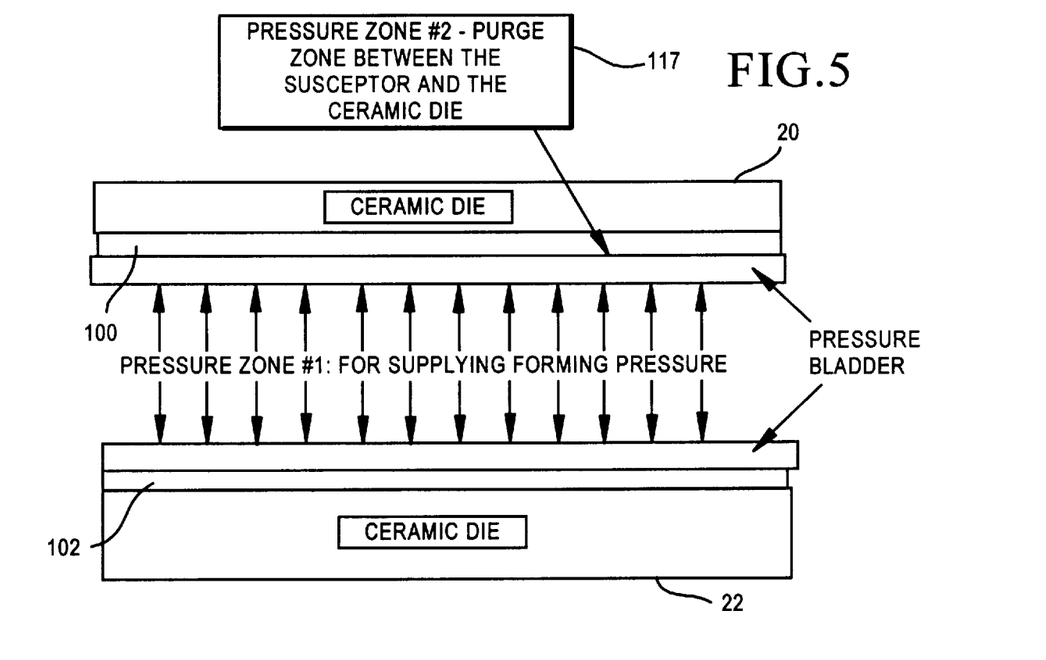
FIG. 5 is a partial sectional view showing expansion of the facesheets against the die surfaces in a retort as an initial step in making a brazed honeycomb panel according to one method of the present invention.
Figure 6:
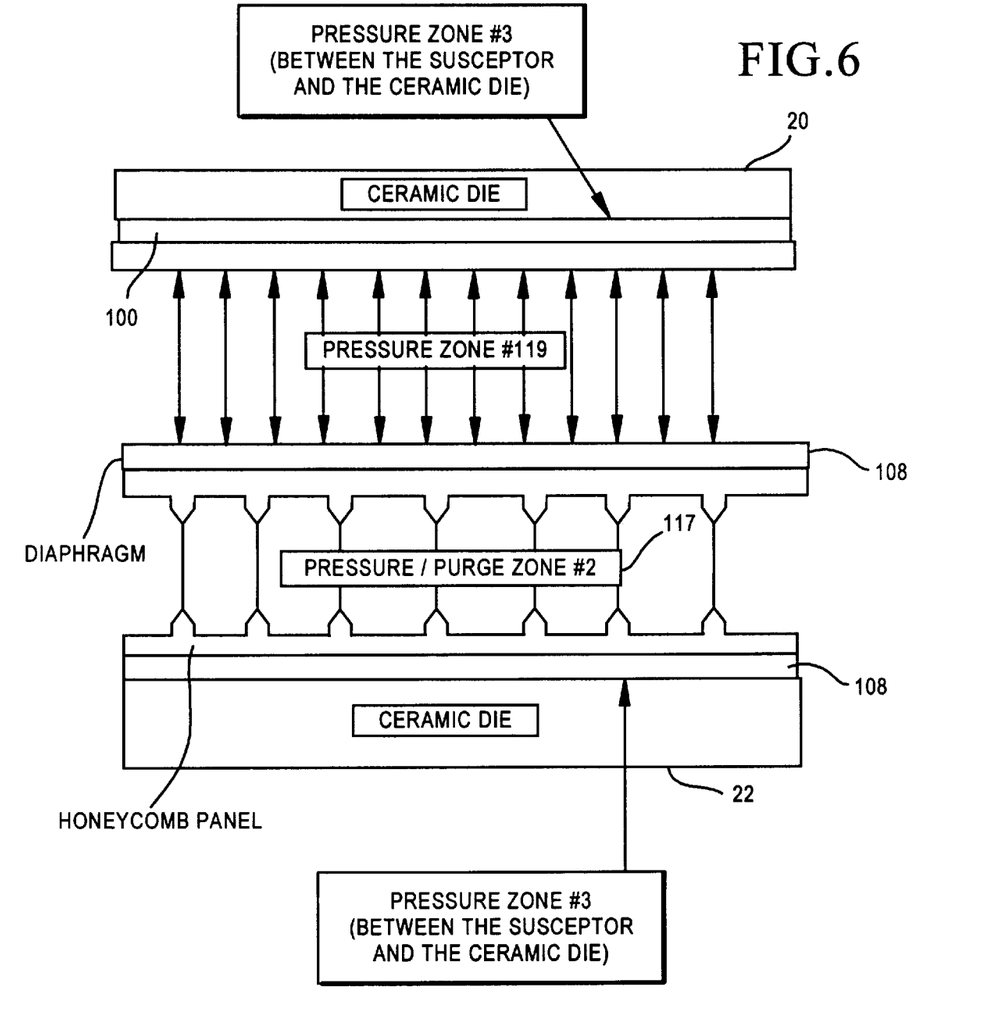
FIG. 6 is another partial sectional view, similar to FIG. 5, but showing a retort having two pressure zones to control the net tooling pressure when brazing a honeycomb core to the formed facesheets.

Forming gas to the pressure zone between the second and third sheet of the susceptors is introduced through suitable pressure lines 122 that penetrate the edge strip gasket 110 at desired locations, as shown in FIG. 4, to deliver pressurized inert gas to the second pressure zone 119. We might also use a titanium pressure bladder in this zone, as shown in the drawings. These pressure lines 122 correspond to those used with the edge welded retorts we described in U.S. Pat. No. 5,530,227. Similar lines can also be used to allow fluid communication with the pressure zone 117 between the first and second sheet of the susceptor where the workpiece is placed. If such lines are used, they generally are used to evacuate the first pressure zone 117 or to flood it with an inert purging gas.

We energize the coil by the coil driver with a time varying electrical field to produce a time varying magnetic field to heat the susceptors inductively to their Curie point. Heat is transferred by conduction and/or radiation from the susceptors into the composite panel, so it, too, reaches consolidation temperature.

Gas is supplied to the second pressure zone between sheets 102 and 108 to force the diaphragm susceptor 102 against the workpiece. The pressure within the pressure zone is maintained until the brazing is complete.

Pressurizing the titanium pressure bladder enclosed within the second pressure zone 119 forces on the workpiece together during brazing. The pressure in zone 119 must be higher than the pressure in zone 117 to provide a net tooling force, but the total tooling force must be kept small to avoid crushing the core. Panels using 3003 aluminum target using a pressure of 15 psi in the first zone and a pressure of 20–25 psi in the second zone, for a net tooling pressure of 5–10 psi on the titanium core and a total of 20–25 psi tooling pressure holding the panel to the OML configuration. We prefer a net tooling pressure of about 10 psi and a total tooling pressure of 25 psi in this case. Because this brazing operation takes place below 1350° F., we are able to use this relatively large (10 psi) tooling pressure. In contrast, for induction brazing of titanium honeycomb panels using TiCuNi brazing alloy, the pressure we prefer for the first zone is 15.5 psi while the pressure for the second zone is 16 psi, for a net tooling pressure of 0.5 psi. Brazing TiCuNi takes place at a higher temperature of about 1780° F. The titanium core is quite soft and easily crushed, so the total and net tooling pressures must be controlled carefully. It also is important to keep the tooling pressure to a minimum.

After completing the brazing, we shut off the induction coils and cool the retort to a cool enough temperature to remove the retort from the dies. Although there is some heat transfer between the retort and the dies, it is insufficient to heat the dies substantially, because we circulate cooling water throughout the induction coil. Therefore, the retort can quickly be pulled from the press. When the retort cools sufficiently, we remove the edge strips and recover the completed part. The edge strips and the susceptor sheets usually are reusable.

It may be advantageous in some circumstances to maintain different pressures in different cells of the pressure zone at different locations of the workpiece. Welding the second and third sheet along one or more weld lines internal of the periphery defines separate pressure cells between these sheets that may be individually pressurized at different pressures. Of course, such welding destroys the reuse potential for these sheets.

We can shape the magnetic field and flus using ferrite blocks 151 (FIG. 7), as Woods suggested, to improve the temperature uniformity in the retort.

While we have described preferred embodiments, those skilled in the art will readily recognize alternatives, variations, and modifications which might be made without departing from the inventive concept. Therefore, interpret the claims liberally with the support of the full range of equivalents known to those of ordinary skill based upon this description. The examples are given to illustrate the invention and not intended to limit it. Accordingly, limit the claims only as necessary in view of the pertinent prior art.

We claim:

1. A method for induction brazing of honeycomb panels, comprising the steps of:
   (a) assembling a retort having at least three sheets of susceptors sandwiching a workpiece to define two pressure zones divided by a diaphragm;
   (b) sealing the susceptor sheets;
   (c) positioning the sealed retort in an induction heating workcell;
   (d) heating the workpiece in the workcell to a brazing temperature by heating the susceptor sheets with induction;
   (e) controlling a net tooling pressure in the pressure zones on either side of the diaphragm to avoid core crush of honeycomb core in the workpiece.

2. A method for brazing metal honeycomb core to facesheets to form a sandwich panel, comprising the steps of:
   (a) optionally, shaping two facesheets in a forming press to create one sheet shaped substantially to an outer mold line (OML) and the second sheet shaped substaintially to an inner mold line (IML);
   (b) assembling the shaped facesheets on opposed faces of a honeycomb core with brazing alloy between the core and each face sheet to define a sandwich panel assembly;
   (c) enclosing the assembly in a multisheet retort, the retort having two outer sheets separated by a central diaphragm to define two pressure zones, wherein the assembly is placed in the first pressure zone with the OML sheet adjacent an outer sheet and the IML sheet adjacent the diaphragm; and (d) brazing the assembly while exerting a pressure in both pressure zones, the pressure in the second pressure zone exceeding the pressure in the first pressure zone and being controlled to avoid core crush while applying a sufficient tooling pressure to accomplish the brazing.

3. The method of claim 2 wherein the retort sheets are susceptible to induction heating and wherein the press is an induction heating workcell.

4. The method of claim 3 wherein the retort sheets have a Curie point within a temperature range suitable to complete the brazing.

5. The method of claim 2 wherein the pressure in the first pressure zone is about 15 psi.

6. The method of claim 2 wherein the net tooling pressure during brazing is from about 0.5–10 psi.

7. The method of claim 4 wherein the net tooling pressure during brazing is from about 0.5–10 .

8. The method of claim 7 wherein the Curie point is about 1780° F. and both the facesheets and core are alloys of titanium.

9. The method of claim 3 wherein the press includes shaped, ceramic dies, each die including embedded segments that interconnect to form a solenoid induction coil surrounding the retort, one die shaped to correspond to the OML while the other die is shaped to correspond to the IML.

10. The method of claim 3 further comprising the step of:

positioning nonconducting ferrite blocks at ends of the assembly to improve temperature uniformity in the assembly during brazing.

11. The method of claim 9 wherein the assembly is substantially along the centerline of the coil.

12. The method of claim 11 further comprising the step of:

positioning nonconducting ferrite blocks at ends of the assembly at edges of the coil substantially along the centerline of the coil to provide improved thermal uniformity in the assembly by shaping the magnetic field and flux.

13. The method of claim 12 wherein at least the outer sheets of the retort have a Curie point in a temperature range substantially at the brazing temperature.

14. The method of claim 6 wherein the net tooling pressure is 0.5–5 psi.

15. The method of claim 7 wherein the net tooling pressure is 0.5–5 psi.

* * * * *